US010212234B2

United States Patent
Kim et al.

(10) Patent No.: US 10,212,234 B2
(45) Date of Patent: *Feb. 19, 2019

(54) OPERATION METHOD OF COMMUNICATION NODE IN NETWORK

(71) Applicants: Hyundai Motor Company, Seoul (KR); Kia Motors Corporation, Seoul (KR)

(72) Inventors: Dong Ok Kim, Gyeonggi-do (KR); Kang Woon Seo, Seoul (KR); Jun Byung Chae, Seoul (KR); Jin Hwa Yun, Seoul (KR); Sang Woo Yu, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,609

(22) Filed: Jan. 18, 2018

(65) Prior Publication Data

US 2018/0146043 A1    May 24, 2018

Related U.S. Application Data

(62) Division of application No. 14/833,604, filed on Aug. 24, 2015, now Pat. No. 9,876,857.

(60) Provisional application No. 62/042,656, filed on Aug. 27, 2014.

(30) Foreign Application Priority Data

Aug. 12, 2015  (KR) .................. 10-2015-0113581

(51) Int. Cl.
  *G06F 15/173* (2006.01)
  *H04L 29/08* (2006.01)
  *H04L 12/12* (2006.01)

(52) U.S. Cl.
  CPC .............. *H04L 67/12* (2013.01); *H04L 12/12* (2013.01); *Y02B 70/30* (2013.01); *Y02B 70/32* (2013.01); *Y02D 50/40* (2018.01); *Y02D 50/42* (2018.01)

(58) Field of Classification Search
  USPC ........ 340/436, 5.72; 370/252, 311, 328, 463; 375/316; 709/203, 206, 217, 219, 223, 709/224, 226, 228, 230, 232, 238
  See application file for complete search history.

(56) References Cited

U.S. PATENT DOCUMENTS

| | | | |
|---|---|---|---|
| 7,925,255 B2 * | 4/2011 | Habermas | H04B 7/18523 375/316 |
| 7,991,351 B2 | 8/2011 | Kuban | |
| 8,400,955 B2 * | 3/2013 | Singh | H04W 52/0206 370/311 |
| 2005/0025080 A1 * | 2/2005 | Liu | H04W 52/0229 370/311 |

(Continued)

*Primary Examiner* — Quang N Nguyen
(74) *Attorney, Agent, or Firm* — Mintz Levin Cohn Ferris Glovsky and Popeo, P.C.; Peter F. Corless

(57) ABSTRACT

An operation method of communication node in a vehicle network is provided. The operation method includes transitioning from a sleep mode to an active mode and generating a first message that includes a first information indicating at least one communication node to be operated in the active mode. In addition, the method includes transmitting the first message to a second communication node to thus enhance performance of a vehicle network.

28 Claims, 5 Drawing Sheets

(56) References Cited

U.S. PATENT DOCUMENTS

| | | | | |
|---|---|---|---|---|
| 2010/0246424 A1* | 9/2010 | Tsuzuki | ............... | H04L 12/12 |
| | | | | 370/252 |
| 2011/0298603 A1* | 12/2011 | King | ............... | G08G 1/042 |
| | | | | 340/436 |
| 2011/0298924 A1* | 12/2011 | Miller | ............... | H04M 1/6075 |
| | | | | 348/148 |
| 2012/0063468 A1* | 3/2012 | Liu | ............... | H04L 12/40032 |
| | | | | 370/463 |
| 2012/0269121 A1* | 10/2012 | Nagai | ............... | G08G 1/092 |
| | | | | 370/328 |
| 2013/0151111 A1* | 6/2013 | Skelton | ............... | B60R 25/00 |
| | | | | 701/99 |
| 2015/0077225 A1* | 3/2015 | Proefke | ............... | G07C 9/00182 |
| | | | | 340/5.72 |

\* cited by examiner

- SLEEP MODE: PHY-LAYER UNIT OFF, MAC-LAYER UNIT OFF
- PASSIVE MODE: PHY-LAYER UNIT ON, MAC-LAYER UNIT OFF
- ACTIVE MODE: PHY-LAYER UNIT ON, MAC-LAYER UNIT ON

OPERATION METHOD OF COMMUNICATION NODE IN NETWORK

CROSS-REFERENCE TO RELATED APPLICATIONS

This application is a Divisional application of U.S. patent application Ser. No. 14/833,604 filed on Aug. 24, 2015, issued as U.S. Pat. No. 9,876,857 on Jan. 23, 2018, which claims priority to U.S. PATENT APPLICATION No. 62/042,656 filed on Aug. 27, 2014, and Korean Patent Application No. 10-2015-0113581 filed on Aug. 12, 2015 in the Korean Intellectual Property Office (KIPO), the entire contents of which are hereby incorporated by reference.

BACKGROUND

1. Technical Field

The present invention relates to an operation of a communication node in a network, and more specifically, to a technique for waking up a communication node.

2. Related Art

Along with the rapid digitalization of vehicle parts, the number and types of electronic devices installed within a vehicle are increasing significantly. Electronic devices may be used in a power train control system, a body control system, a chassis control system, a vehicle network, a multimedia system, or the like. The power train control system may include an engine control system, an automatic transmission control system, etc. The body control system may include a body electronic equipment control system, a convenience apparatus control system, a lamp control system, etc. The chassis control system may include a steering apparatus control system, a brake control system, a suspension control system, etc. The vehicle network may include a controller area network (CAN), a FlexRay-based network, a media oriented system transport (MOST)-based network, etc. The multimedia system may include a navigation apparatus system, a telematics system, an infotainment system, etc.

Such systems and electronic devices constituting each of the systems are connected via the vehicle network, which supports functions of the electronic devices. The CAN may support a transmission rate of up to 1 Mbps and may support auto retransmission of colliding messages, error detection-based on a cycle redundancy interface (CRC), etc. The FlexRay-based network may support a transmission rate of up to 10 Mbps and may support simultaneous transmission of data through two channels, synchronous data transmission, etc. The MOST-based network is a communication network for high-quality multimedia, which may support a transmission rate of up to 150 Mbps.

Meanwhile, the telematics system, the infotainment system, and an enhanced safety system of a vehicle require high transmission rates and system expandability. However, the CAN, FlexRay-based network, or the like may not sufficiently support such requirements. The MOST-based network may support a higher transmission rate than the CAN and the FlexRay-based network. However, costs increase to apply the MOST-based network to all vehicle networks. Due to these limitations, an Ethernet based network may be considered as a vehicle network. The Ethernet-based network may support bi-directional communication through one pair of windings and may support a transmission rate of up to 10 Gbps.

As for an Ethernet-based vehicle network, the electronic devices constituting respective systems in the vehicle network may operate in an active mode, a sleep mode (or a doze mode), etc. The electronic devices basically operate in the sleep mode. In particular, the electronic devices may transition from the sleep mode to the active mode, and perform a particular operation in the active mode (e.g., an operation related to an infotainment system). To perform the particular operation, only some electronic devices are required to be woken up (e.g., activated from a sleep mode). However, both the electronic devices required for performing the particular operation and also other electronic devices may transition from the sleep mode to the active mode. In other words, electronic devices not involved in performing the particular operation may be woken up, thus causing unnecessary waste of resources.

SUMMARY

Accordingly, exemplary embodiments of the present invention are provided to substantially obviate one or more problems due to limitations and disadvantages of the related art. Exemplary embodiments of the present invention provide a wake-up method of a communication node in a network.

In order to achieve the objectives of the present invention, an operation method of a first communication node in an Ethernet-based vehicle network may include transitioning from a sleep mode to an active mode; generating a first message including a first information that indicates at least one communication node to be operated in the active mode; and transmitting the first message to a second communication node.

Particularly, the first information may be an identification information regarding the at least one communication node to be operated in the active mode. The identification information may further be at least one of an Internet protocol (IP) address, a medium access control (MAC) address, and a port number of the at least one communication node to be operated in the active mode. The first information may be information that indicates a vehicle system corresponding to the at least one communication node to be operated in the active mode.

Further, the first information may be information that indicates a vehicle operation performed by the at least one communication node to be operated in the active mode. The second communication node may be a switch or a bridge, and the first communication node may be an end node connected to the second communication node. In particular, the first message may be generated based on an Ethernet protocol, and the first information may be included in at least one of a medium access control (MAC) header and a logic link control (LLC) frame of the first message.

Moreover, an operation method of a first communication node in an Ethernet-based vehicle network may include receiving a first message from a second communication node; detecting at least one communication node to be operated in an active mode, the at least one communication node indicated by a first information included in the first message; and transmitting the first message to the at least one communication node to be operated in the active mode.

In addition, the operation method may further include transmitting to at least one communication node that is not indicated by the first information among a plurality of communication nodes connected to the first communication node a second message instructing the at least one communication node that is not indicated by the first information to operate in a passive mode; wherein in the passive mode, a physical (PHY) layer unit included in a communication node is woken up (e.g., activated), and in the active mode, the PHY layer unit and a medium access control (MAC) layer unit included in a communication node may be woken up.

In particular, the first information may be identification information regarding the at least one communication node to be operated in the active mode. The identification information may be at least one of an Internet protocol (IP) address, a medium access control (MAC) address, and a port number of the at least one communication node to be operated in the active mode. The first information may further be information that indicates a vehicle system that corresponds to the at least one communication node to be operated in the active mode. The first information may be information that indicates a vehicle operation performed by the at least one communication node to be operated in the active mode. The first communication node may be a switch or a bridge, and the second communication node may be an end node connected to the first communication node.

Additionally, an operation method of a first communication node in an Ethernet-based vehicle network may include receiving a first message from a second communication node; and transitioning from a sleep mode to a passive mode when an intensity of a reception signal of the first message is equal to or greater than a predetermined reference, wherein in the passive mode, a physical (PHY) layer unit included in the first communication node may be woken up.

In addition, the operation method may further include transitioning from the passive mode to an active mode in response to determining by a first information included in the first message that the first communication node is a communication node to be operated in the active mode. In the active mode, a medium access control (MAC) layer unit included in the first communication node may be woken up.

The first information may be at least one of an Internet protocol (IP) address, a medium access control (MAC) address, and a port number of the first communication node. The first information may further be information that indicates a vehicle system that corresponds to the first communication node. The first information may be information indicating a vehicle operation performed by the first communication node. In addition, the operation method may further include transitioning from the passive mode to the sleep mode when failing to receive a second message to instruct transition to the active mode from the second communication node within a predetermined time period from a reception end time of the first message.

BRIEF DESCRIPTION OF DRAWINGS

Exemplary embodiments of the present invention will become more apparent by describing in detail exemplary embodiments of the present invention with reference to the accompanying drawings, in which.

DETAILED DESCRIPTION

Figure 1:
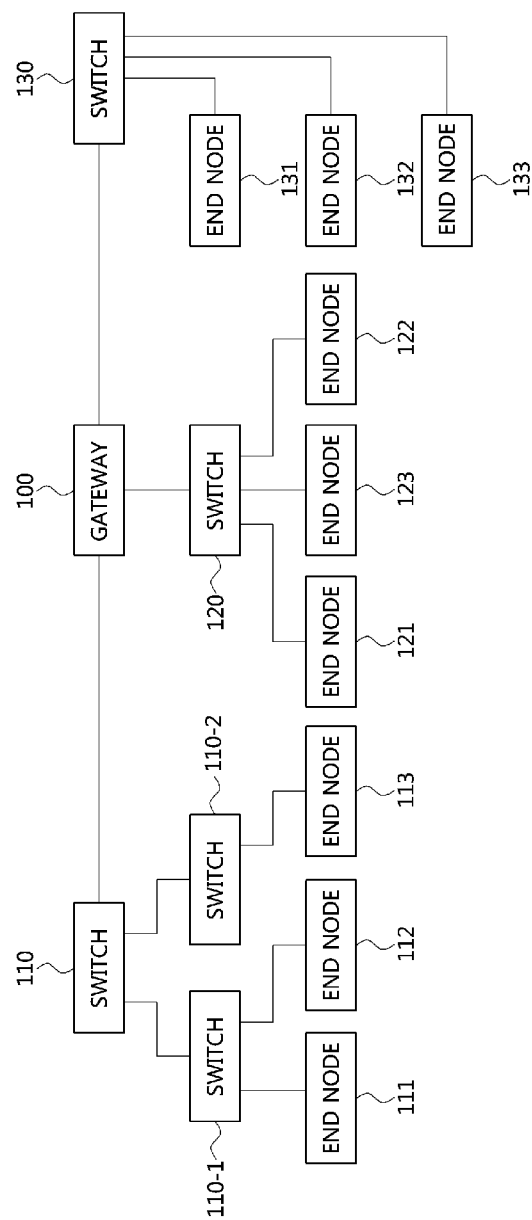
FIG. 1 is a diagram illustrating a vehicle network topology according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present invention may be variously modified and have several exemplary embodiments, specific exemplary embodiments will be shown in the accompanying drawings and be described in detail in the detailed description. It should be understood, however, that it is not intended to limit the present invention to the specific embodiments but, on the contrary, the present invention is to cover all modifications and alternatives falling within the spirit and scope of the present invention.

Relational terms such as first, second, and the like may be used for describing various elements, but the elements should not be limited by the terms. These terms are only used to distinguish one element from another. For example, a first component may be named a second component without being departed from the scope of the present invention and the second component may also be similarly named the first component. The term 'and/or' means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this invention belongs. Terms such as terms that are generally used and have been in dictionaries should be construed as having meanings matched with contextual meanings in the art. In this description, unless defined clearly, terms are not ideally, excessively construed as formal meanings.

Hereinafter, exemplary embodiments of the present invention will be described in detail with reference to the accompanying drawings. In describing the invention, to facilitate the entire understanding of the invention, like numbers refer to like elements throughout the description of the figures and the repetitive description thereof will be omitted.

FIG. 1 is a diagram showing a vehicle network topology according to an exemplary embodiment. Referring to FIG. 1, a communication node may include a gateway, a switch (or bridge), or an end node. The gateway 100 may be connected with at least one switch 110, 110-1, 110-2, 120, and 130 and may be configured to connect different networks. For example, the gateway 100 may connect a switch that supports a controller area network (CAN) (e.g., FlexRay, media oriented system transport (MOST), or local interconnect network (LIN)) protocol and a switch that supports an Ethernet protocol. The switches 110, 110-1, 110-2, 120, and 130 may be connected with at least one end nodes 111, 112, 113, 121, 122, 123, 131, 132, and 133. The switches 110, 110-1, 110-2, 120, and 130 may interconnect and operate the end nodes 111, 112, 113, 121, 122, 123, 131, 132, and 133.

The end nodes 111, 112, 113, 121, 122, 123, 131, 132, and 133 may include an electronic control unit (ECU) configured to operate various types of devices mounted within a vehicle. For example, the end nodes 111, 112, 113, 121, 122, 123, 131, 132, and 133 may include an ECU configured to operate an infotainment device (e.g., a display device, a navigation device, and an around view monitoring device).

Communication nodes (e.g., a gateway, a switch, an end node, or the like) included in a vehicle network may be connected in a star topology, bus topology, ring topology, tree topology, mesh topology, etc. In addition, the communication nodes of the vehicle network may support a CAN protocol, FlexRay protocol, MOST protocol, LIN protocol, or Ethernet protocol. Exemplary embodiments of the present invention may be applied to the above-described network topology. The network topology to which exemplary embodiments of the present invention are to be applied is not limited thereto and may be configured in various ways.

Figure 2:
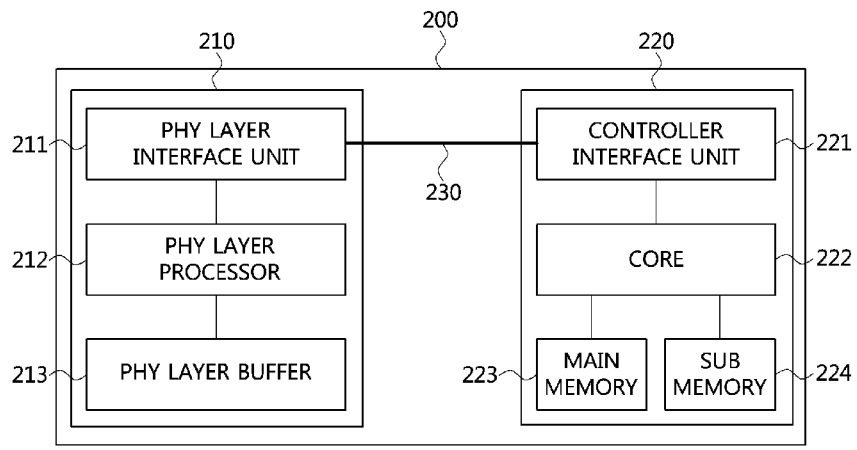
FIG. 2 is a diagram illustrating a communication node constituting a vehicle network according to an exemplary embodiment of the present invention.

FIG. 2 is a diagram showing a communication node constituting a vehicle network according to an exemplary embodiment. Notably, the various methods discussed herein below may be executed by a controller having a processor and a memory. Referring to FIG. 2, a communication node 200 of a network may include a PHY layer block 210 and a controller 220. In particular, the controller 220 may be implemented to include a medium access control (MAC) layer. A PHY layer block 210 may be configured to receive or transmit signals from or to another communication node. The controller 220 may be configured to operate the PHY layer block 210 and perform various functions (e.g., an infotainment function). The PHY layer block 210 and the controller 220 may be implemented as one system on chip (SoC) or alternatively, may be implemented as separate chips.

Further, the PHY layer block 210 and the controller 220 may be connected via a media independent interface (MII) 230. The MII 230 may include an interface defined in the IEEE 802.3 and may include a data interface and a management interface between the PHY layer block 210 and the controller 220. One of a reduced MII (RMII), a gigabit MII (GMII), a reduced GMII (RGMII), a serial GMII (SGMII), a 10 GMII (XGMII) may be used instead of the MII 230. A data interface may include a transmission channel and a reception channel, each of which may have an independent clock, data, and a control signal. The management interface may include a two-signal interface, one signal for the clock and one signal for the data.

Particularly, the PHY layer block 210 may include a PHY layer interface unit 211, a PHY layer processor 212, and a PHY layer buffer 213. The configuration of the PHY layer block 210 is not limited thereto, and the PHY layer block 210 may be configured in various ways. The PHY layer interface unit 211 may be configured to transmit a signal received from the controller 220 to the PHY layer processor 212 and transmit a signal received from the PHY layer processor 212 to the controller 220. The PHY layer processor 212 may be configured to execute operations of the PHY layer interface unit 211 and the PHY layer buffer 213. The PHY layer processor 212 may be configured to modulate a signal to be transmitted or demodulate a received signal. The PHY layer processor 212 may be configured to operate the PHY layer buffer 213 to input or output a signal. The PHY layer buffer 213 may be configured to store the received signal and output the stored signal based on a request from the PHY layer processor 212.

The controller 220 may be configured to monitor and operate the PHY layer block 210 using the MII 230. The controller 220 may include a controller interface 221, a core 222, a main memory 223, and a sub memory 224. The configuration of the controller 220 is not limited thereto, and the controller 220 may be configured in various ways. The controller interface 221 may be configured to receive a signal from the PHY layer block 210 (e.g., the PHY layer interface 211) or an upper layer (not shown), transmit the received signal to the core 222, and transmit the signal received from the core 222 to the PHY layer block 210 or upper layer. The core 222 may further include an independent memory control logic or an integrated memory control logic for operating the controller interface 221, the main memory 223, and the sub memory 224. The memory control logic may be implemented to be included in the main memory 223 and the sub memory 224 or may be implemented to be included in the core 222.

Furthermore, each of the main memory 223 and the sub memory 224 may be configured to store a signal processed by the core 222 and may be configured to output the stored signal based on a request from the core 222. The main memory 223 may be a volatile memory (e.g., a random access memory (RAM)) configured to temporarily store data required for the operation of the core 222. The sub memory 224 may be a non-volatile memory in which an operating system code (e.g., a kernel and a device driver) and an application program code for performing a function of the controller 220 may be stored. A flash memory having a high processing speed or a hard disc drive (HDD) or a compact disc-read only memory (CD-ROM) for large capacity data storage may be used as the non-volatile memory. Typically, the core 222 may include a logic circuit having at least one processing core. A core of an Advanced RISC Machines (ARM) family or a core of an Atom family may be used as the core 222.

A method performed by a communication node and a corresponding counterpart communication node, which belong to a vehicle network, will be described below. Although a method (e.g., signal transmission or reception) performed by a first communication node will be described below, a second communication node that corresponds thereto may perform a method (e.g., signal reception or transmission) corresponding to the method performed by the first communication node. In other words, when an operation of the first communication node is described, the second communication node corresponding thereto may be configured to perform an operation that corresponds to the operation of the first communication node. Additionally, when an operation of the second communication node is described, the first communication node may be configured to perform an operation that corresponds to an operation of a switch.

Meanwhile, as for an Ethernet-based vehicle network, communication nodes of each system mounted within a vehicle (e.g., a power train control system, a body control system, a chassis control system, and a multimedia system) may be configured to operate in a sleep mode, a passive mode, and an active mode.

Figure 3:
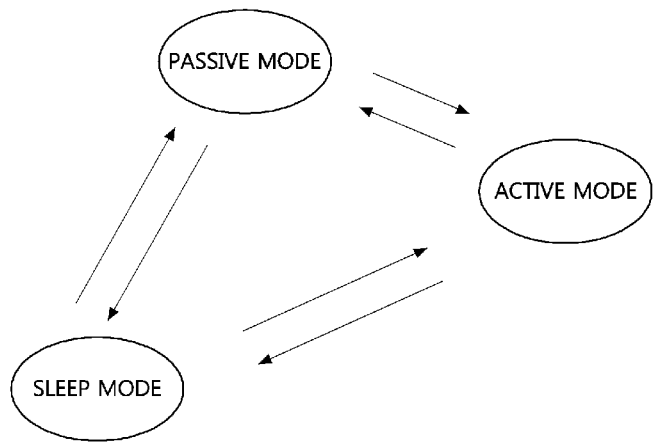
FIG. 3 is a diagram illustrating an operation mode of a communication node according to an exemplary embodiment of the present invention.

FIG. 3 is a diagram illustrating an operation mode of a communication node. Referring to FIG. 3, a communication node may be configured to operate in a sleep mode, and transition from the sleep mode to the passive mode or the active mode when required. The communication node operating in the passive mode may be configured to transition to the sleep mode or the active mode, and the communication node operating in the active mode may be configured to transition to the sleep mode or the passive mode.

In the sleep mode, a physical (PHY) layer unit (e.g., a PHY layer block 210 described above with reference to FIG. 2) and a media access control (MAC) layer unit (e.g., a controller 220 described above with reference to FIG. 2), both included in the communication node, may be maintained in the sleep state. In the passive mode, the PHY layer unit included in the communication node may be woken up (e.g., activated from a sleep mode) and may be operated in the active state, and the MAC layer unit included in the communication node may be maintained in the sleep state. In the active mode, the PHY layer unit and the MAC layer unit, both included in the communication node, may be woken up and may be operated in the active state.

Figure 4:
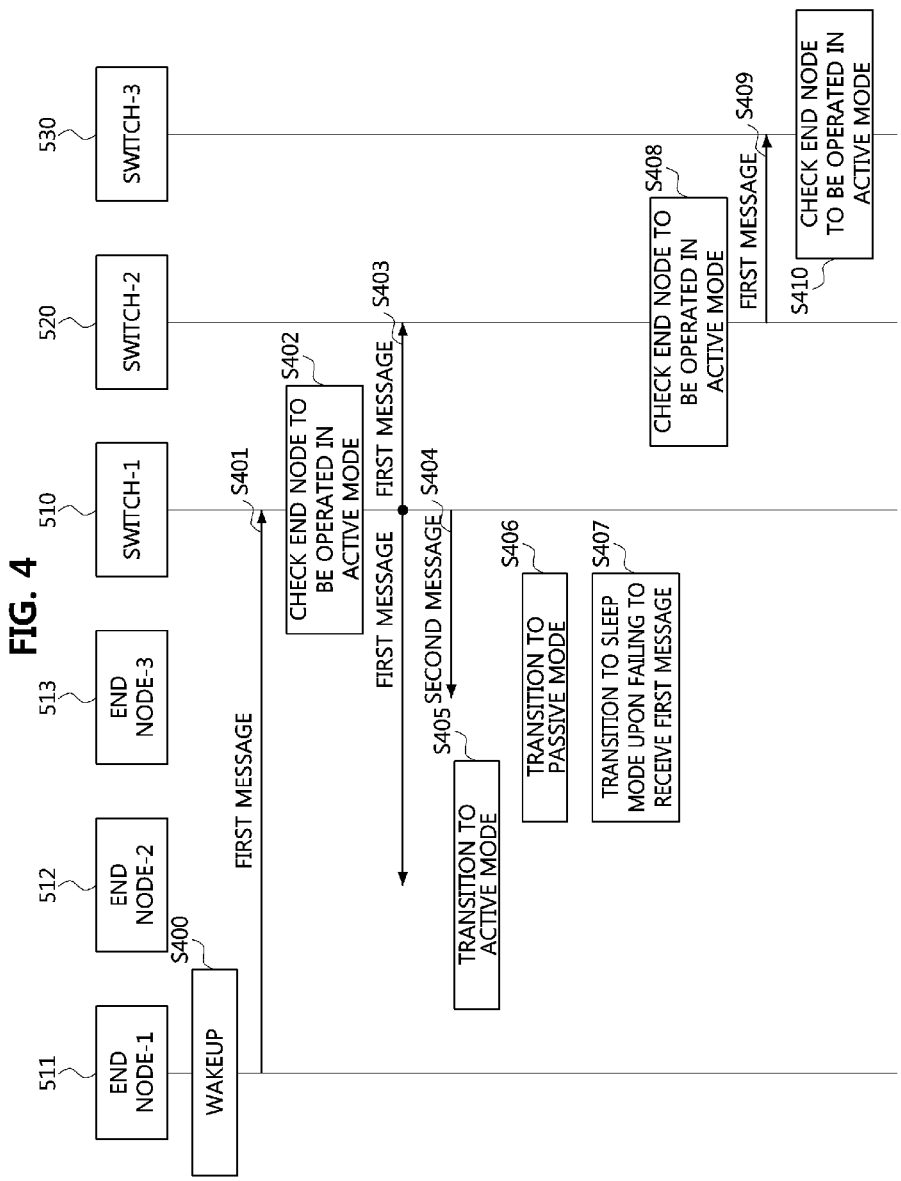
FIG. 4 is a sequence chart illustrating a wake-up method of a communication node according to an exemplary embodiment of the present invention.
Figure 5:
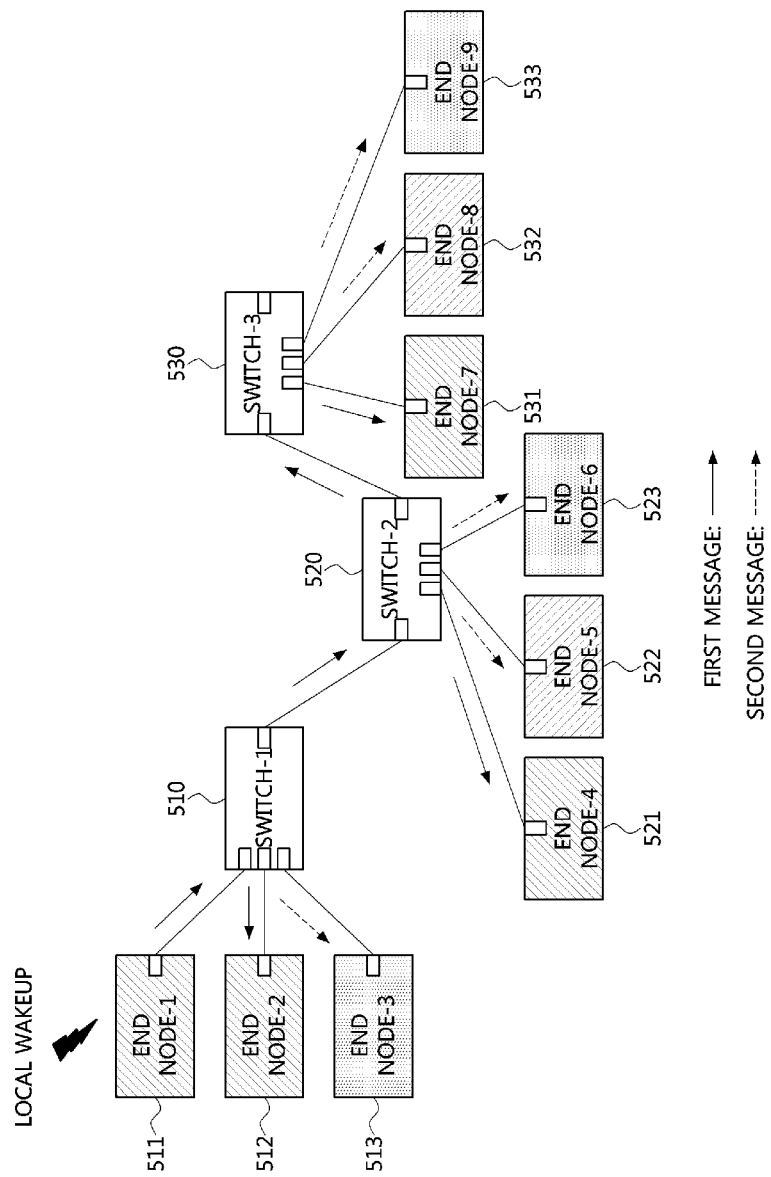
FIG. 5 is a diagram illustrating a vehicle network to which a wake-up method of a communication node according to an exemplary embodiment of the present invention is applied.

Hereinafter, a wake-up method of a communication node in the Ethernet-based vehicle network will be described. FIG. 4 is a sequence chart illustrating a wake-up method of a communication node according to an exemplary embodiment of the present invention, and FIG. 5 is a block diagram illustrating a vehicle network to which a wake-up method of a communication node is applied according to an exemplary embodiment of the present invention. The wake-up method according to an exemplary embodiment of the present invention may be applied to a vehicle network which will be described below and various vehicle networks.

Referring to FIGS. 4 and 5, switches 510, 520 and 530 and end nodes 511, 512, 513, 521, 522, 523, 531, 532 and 533 may each support the Ethernet protocol. The switches 510, 520 and 530 and the end nodes 511, 512, 513, 521, 522, 523, 531, 532 and 533 may each represent the communication node 200 described above with reference to FIG. 2. The switch-1 510 may be connected to the end nodes 511, 512 and 513 via respective ports, and may be connected to the switch-2 520. The switch-2 520 may be connected to the end nodes 521, 522 and 523 via respective ports, and may be connected to the switch-1 510 and the switch-3 530. The switch-3 530 may be connected to the end nodes 531, 532 and 533 via respective ports, and may be connected to the switch-3 530.

Further, the end nodes 511, 512, 513, 521, 522, 523, 531, 532 and 533 connected to one switch 510, 520 or 530 may correspond to different systems. For example, the end node-1 511, the end node-2 512, the end node-4 521 and the end node-7 531 may correspond to a first system mounted within the vehicle (e.g., a multimedia system). To perform an operation related to the first system, the end nodes 511, 512, 521 and 531 may each operate in the active mode. The end node-5 522 and the end node-8 532 may each correspond to a second system mounted within the vehicle (e.g., a body control system). To perform an operation related to the second system, the end nodes 522 and 532 may each operate in the active mode. The end node-3 513, the end node-6 523 and the end node-9 533 may each belong to a third system mounted within the vehicle (e.g., a power train control system). To perform an operation related to the third system, the end nodes 513, 523 and 533 may each operate in the active mode.

Moreover, the switches 510, 520 and 530 and the end nodes 511, 512, 513, 521, 522, 523, 531, 532 and 533 may each have topology information regarding the vehicle network. The topology information represents arrangement information regarding each of communication nodes constituting the vehicle network, identification information regarding each of the communication nodes of the vehicle network, information regarding communication nodes corresponding to each of the systems mounted within the vehicle, and information regarding communication nodes performing each vehicle operation (e.g., operations of systems mounted within the vehicle).

For example, the identification information regarding a communication node may include an Internet protocol (IP) address, a MAC address, and a port number. The information regarding communication nodes corresponding to a system mounted within the vehicle may include the end nodes 511, 512, 521 and 531 corresponding to the first system, the end nodes 522 and 532 corresponding to the second system, and the end nodes 513, 523 and 533 corresponding to the third system. The information regarding communication nodes performing each vehicle operation may indicate the end nodes 511 and 512 performing a first operation (e.g., a navigation-related operation) and the end nodes 521 and 531 performing a second operation (e.g., a rear-side imaging device-related operation).

The switches 510, 520 and 530 and the end nodes 511, 512, 513, 521, 522, 523, 531, 532 and 533 may each be configured to receive a message including the topology information regarding the vehicle network from an upper level communication node (e.g., a switch, a gateway, etc.) when power is applied to the vehicle network (e.g., when a battery is mounted within the vehicle), and detect the topology of the vehicle network via the received message. Alternatively, the switches 510, 520 and 530 and the end nodes 511, 512, 513, 521, 522, 523, 531, 532 and 533 may each be configured to previously store the topology information regarding the vehicle network, and upon power applied to the vehicle, the switches 510, 520 and 530 and the end nodes 511, 512, 513, 521, 522, 523, 531, 532 and 533 may each be configured to detect the topology of the vehicle network based on the information stored therein.

Meanwhile, the end node-1 311 may be woken up upon receiving a particular signal (e.g., a wake-up signal) (S400). In other words, the end node-1 311 may be configured to transition from the sleep mode to the active mode. The end node-1 311 having transitioned to the active mode may be configured to generate first information indicating at least communication node to be operated in the active mode, and generate a first message including the generated first information. The first message may represent a wake-up message.

Further, the first information may include at least one of identification information regarding the at least one communication node to be operated in the active mode (e.g., an IP address, a MAC address, and a port number), information indicating a system of a vehicle that corresponds to the at least one communication node to be operated in the active mode, and information indicating an operation of a vehicle performed by the at least one communication node to be operated in the active mode.

For example, when the at least one communication node to be operated in the active mode is the end node-2 512, the end node-4 521 and the end node-7 531, the end node-1 511 may be configured to generate first information including identification information regarding each of the end node-2 512, the end node-4 521 and the end node-7 531, and generate a first message that includes the first information. Alternatively, when a system that corresponds to the end node-2 512, the end node-4 521 and the end node-7 531 to be operated in the active mode, is a first system, the end node-1 511 may be configured to generate first information that indicates the first system, and generate a first message that includes the generated first information. First information indicating each system mounted within the vehicle may be set as in Table 1 below.

TABLE 1

| Systems included in vehicle | First information |
| --- | --- |
| First system | 0000 |
| Second system | 0001 |
| Third system | 0010 |

For example, the first system of the vehicle may be indicated by a binary number "0000," the second system may be indicated by a binary number "0001" and the third system may be indicated by a binary number "0010." The first information indicating each system mounted within the vehicle is not limited to the content of Table 1, and may be set in various manners.

When an operation of the vehicle performed by each of the end node-2 512, the end node-4 521 and the end node-7 531 to be operated in the active mode is a first operation, the end node-1 511 may be configured to generate first information that indicates the first operation, and generate a first message that includes the generated first information. First information indicating each operation of the vehicle may be set as in Table 2 below.

TABLE 2

| Operations of vehicle | First information |
| --- | --- |
| First operation | 1000 |
| Second operation | 1001 |
| Third operation | 1010 |

For example, the first operation of the vehicle may be indicated by a binary number "1000," the second operation may be indicated by a binary number "1001" and the third operation may be indicated by a binary number "1010." The first information indicating each operation of the vehicle is not limited to the content of Table 2, and may be set in various manners. Meanwhile, the first message may be generated based on the Ethernet protocol. The first message may have the following structure.

Figure 6:
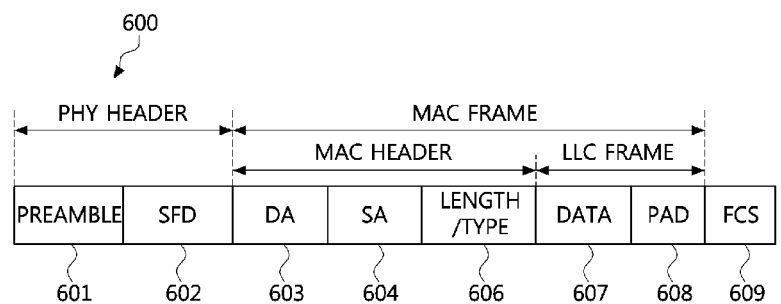
FIG. 6 is a diagram illustrating a message used in an Ethernet-based vehicle network according to an exemplary embodiment of the present invention.

FIG. 6 is a diagram illustrating a message used in an Ethernet-based vehicle network according to an exemplary embodiment of the present invention. Referring to FIG. 6, an Ethernet protocol-based message 600 may include a physical (PHY) header, a MAC frame, and a frame check sequence (FCS) field 609. The MAC frame may be generated by the controller 220 of the communication node 200. The PHY header may include a preamble 601 and a start frame delimiter (SFD) field 602. The preamble 601 may have a size of about 7 octets and may be used for timing synchronization. The SFD field 602 may have a size of about 1 octet and may have a sequence of "10101011."

The MAC frame may be positioned behind the SFD field 602 and may include an MAC header or may include the MAC header and a logic link control (LLC) frame. The MAC header may include a destination address (DA) field 603, a source address (SA) field 604, and a length/type field 605. The DA field 603 may have a size of about 6 octets and may include identification information (e.g., an MAC address) regarding the communication node that receives the MAC frame. The SA field 604 may have a size of about 6 octets and may include identification information (e.g., an MAC address) regarding the communication node that transmits the MAC frame.

Further, the length/type field 606 may have a size of about 2 octets and may indicate the length of the data field 607 or an Ethernet type supported by a communication node that transmits the protocol-based message 600. For example, when a first octet value included in the length/type field 606 is less than or equal to the decimal value 1500, the length/type field 606 may indicate the length of the data field 607. When the first octet value included in the length/type field 606 is equal to or greater than the decimal value 1536, the length/type field 606 may indicate an Ethernet type. The LLC frame may include the data field 607 and a pad field 608 when necessary (e.g., to satisfy a minimum size of the MAC frame). In particular, the pad field 608 may be added behind the data field 607.

Figure 7:
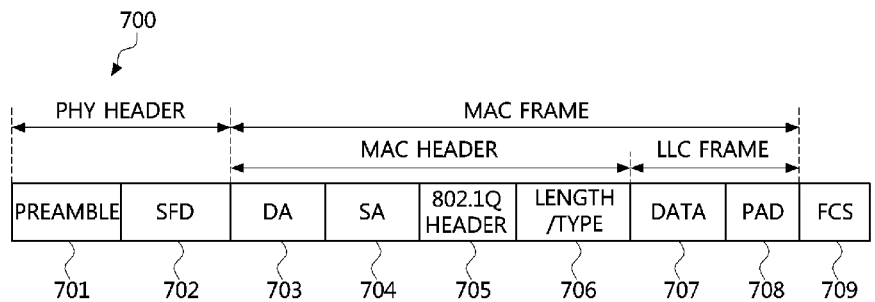
FIG. 7 is a diagram illustrating a message used in an Ethernet-based vehicle network according to another exemplary embodiment of the present invention.

FIG. 7 is a diagram illustrating a message used in an Ethernet-based vehicle network according to an exemplary embodiment of the present invention. Referring to FIG. 7, an Ethernet protocol-based message 700 may include a PHY header, a MAC frame, and a frame check sequence (FCS) field. The Ethernet protocol-based message 700 may represent a message specified in IEEE 802.1Q. The PHY header may include a preamble 701 and a start frame delimiter (SFD) field 702. The preamble 701 and the SFD field 702 may be identical to the preamble 601 and the SFD field 602 described above with reference to FIG. 6, respectively. The MAC frame may be a position after the SFD field 702 and may include only a MAC header, or include a MAC header and an LLC frame.

Particularly, the MAC header may include a DA field 703, an SA field 704, an 802.1Q header 705, and a length/type field 706. The DA field 703, the SA field 704, and the length/type field 706 may be identical to the DA field 603, the SA field 604, and the length/type field 606 described above with reference to FIG. 6, respectively. The 802.1Q header 705 may have a size of about 4 octets. The first and second octets included in the 802.1Q header 705 may indicate a tag protocol identifier (TPID), and the third and fourth octets included in the 802.1Q header 705 may indicate a tag control identifier (TCI). The LLC frame may include a data field 707, and when needed, further include a pad field 708 (e.g., to satisfy the minimum size of the MAC frame). In particular, the pad field 708 may be added after the data field 707.

Referring again to FIGS. 4 and 5, the first information may be included in the MAC header or the data field of the first message. As for the message described with reference to FIG. 7, the first information may be included in the 802.1Q header 705. In other words, the first information may be indicated by the TPID included in the 802.1Q header 705. The end node-1 511 may be configured to transmit the first message to the switch-1 510 (S401). The switch-1 510 may operate in the sleep mode, and upon receiving the first message from the end node-1 511, may be configured to transition from the sleep mode to the passive mode or the active mode. For example, the switch-1 510 may be configured to transition from the sleep mode to the passive mode in response to determining based on an energy detection operation that an intensity of a reception signal of a preamble included in the first message is equal to or greater than a predetermined reference, and the switch-1 510 having transitioned to the passive mode may transition from the passive mode to the active mode upon receiving the MAC frame included in the first message. The operation of the switch-1 510 in the passive mode may be different from an operation of the switch-1 510 in the active mode.

In the passive mode, the MAC layer unit included in the switch-1 510 may be maintained in the sleep state, and the PHY layer unit included in the switch-1 510 may be woken up and operated in the active state. In particular, the switch-1 510 may be unable to detect the first information included in the MAC frame of the first message, and thus may be configured to perform routing on the first message based on a predefined routing rule (e.g., based on a routing table). For example, when the predefined routing rule states that a message received via a port 1 (e.g., a port connected to the end node-1 511) is routed via a port 2 (e.g., a port connected to the end node-2 512) and a port 4 (e.g., a port connected to the switch-2 520), the switch-1 510 upon receiving the first message from the end node-1 511 via the port 1 may be configured to determine to route the first message via the port 2 and the port 4 based on the predefined routing rule (S402), and route the first message via the port 2 and the port 4 (S403).

In addition, the switch-1 510 may be configured to transmit a second message via a port 3 through which the first message is not routed (S404). In other words, the switch-1 510 may be configured to transmit the second message to the end node-3 513 via the port 3. The second message may provide an instruction to operate in the passive mode. The second message may be composed of a PHY header (e.g., a preamble included in the first message) without a MAC frame. The transmission of the second message may be omitted. The switch-1 510 may be configured to transition from the passive mode to the sleep mode after routing the second message (or after routing the first message when the transmission of the second message is omitted).

Meanwhile, the switch-1 510 operating in the active mode may be configured to obtain the first information included in the MAC frame of the first message, and based on the first information, detect at least one end node to be operated in the active mode (S402). For example, when the first information includes identification information regarding the at least one end node to be operated in the active mode, the switch-1 510 may be configured to determine an end node that corresponds to the identification information as an end node to be operated in the active mode. Alternatively, when the first information indicates a vehicle system that corresponds to the at least one end node to be operated in the active mode, the switch-1 510 may be configured to determine an end node corresponding to the system as an end node to be operated in the active mode. Additionally, when the first information indicates an operation of a vehicle operated by at least one end node to be operated in the active mode, the switch-1 510 may be configured to determine an end node performing the operation as an end node to be operated in the active mode.

For example, when the at least one end node to be operated in the active mode is determined to the end node-2 512, the end node-4 521 and the end node-7 531, the switch-1 510 may be configured to transmit the first message to the end node-2 512 and the switch-2 520 (S403). In addition, the switch-1 510 may be configured to transmit a second message to the end node-3 513 which is not indicated by the first information included in the message among the end nodes 511, 512 and 513 connected to the switch-1 510 (e.g., to an end node not to be operated in the active mode) (S404).

Furthermore, the second message may provide an instruction to operate in the passive mode. The second message may be composed of a PHY header (e.g., a preamble included in the first message) without a MAC frame. The transmission of the second message may be omitted. In other words, the switch-1 510 may not transmit any message to the end node-3 513 that is not indicated by the first information included in the first message among the end nodes 511, 512 and 513 connected to the switch-1 510. The switch-1 510 may be configured to transition from the active mode to the sleep mode or the passive mode after transmitting the second message (or after transmitting the first message in the case when the transmission of the second message is omitted).

Moreover, the end node-2 512 upon receiving the first message from the switch-1 510 may be woken up (S405). For example, the end node-2 512 may be configured to transition from the sleep mode to the passive mode in response to determining, based on the energy detection operation, that an intensity of a reception signal of a preamble included in the first message is equal to or greater than the predetermined reference. Additionally, the end node-2 512 may be maintained in the sleep mode in response to determining, based on the energy detection operation, that an intensity of a reception signal of a preamble included in the first message is less than the predetermined reference. The end node-2 512 having transitioned to the passive mode may be configured to transition from the passive mode to the active mode upon receiving the MAC frame included in the first message (e.g., upon receiving the first information included in the MAC frame). In addition, the end node-2 512 may be maintained in the active mode when the first information included in the first message indicates the end node-2 512, and if not, transition from the active mode to the sleep mode or the passive mode.

The end node-3 513 may be configured to transition from the sleep mode to the passive mode in response to determining, based on the energy detection operation, that an intensity of a reception signal of the second message is equal to or greater than the predetermined reference (S406). The end node-3 513 may be maintained in the sleep mode in response to determining, based on the energy detection operation, that an intensity of a reception signal of the second message is less than the predetermined reference.

The end node-3 513 having transitioned to the passive mode may be configured to transition from the passive mode to the sleep mode without receiving a message including the first information (e.g., the first message) within a predetermined time period (S407). The end node-3 having transitioned to the passive mode may be configured to transition from the passive mode to the active mode upon receiving a message including the first information within the predetermined time period. In particular, the end node-3 513 may be maintained in the active mode when the first information included in the message indicates the end node-3 513, and if not, transition from the active mode to the sleep mode or the passive mode.

Meanwhile, the switch-2 520 may be configured to receive the first message from the switch-1 510. For example, the switch-2 520 may be configured to transition from the sleep mode to the passive mode in response to determining, based on the energy detection operation, that an intensity of a reception signal of a preamble included in the first message is equal to or greater than the predetermined reference, and the switch-2 520 having transitioned to the passive mode may be configured to transition from the passive mode to the active mode upon receiving the MAC frame included in the first message.

The switch-2 520 may be configured to obtain the first information included in the first message, and using the first information, detect at least one end node to be operated in the active mode (S408). In addition, the switch-2 520 may be configured to detect the at least one end node to be operated in the active mode in a manner similar to operation S402 described above. When an end node to be operated in an active mode is detected as the end node-4 521 and the end node-7 531, the switch-2 520 may be configured to transmit the first message to the end node-4 521 and the switch-3 530 (S409).

Further, the switch-2 520 may be configured to transmit a second message to the end node-5 522 and the end node-6 523 that are not indicated by the first information included in the first message among the end nodes 521, 522 and 523 connected to the switch-2 520. The transmission of the second message may be omitted. The switch-2 520 may be configured to transition from the active mode to the sleep mode or the passive mode after transmitting the second message (or after transmitting the first message when the transmission of the second message is omitted).

Upon receiving the first message from the switch-2 520, the end node-4 521 may be configured to transition from the sleep mode to the active mode in a manner similar to the operations of the end node-1 511 and the end node-2 512 described above. Further, upon receiving the second message from the switch-2 520, the end node-5 522, and the end node-6 523 may be configured to transition from the sleep mode to the passive mode in a manner similar to the operations of the end node-3 513 described above. In addition, the end node-5 522 and the end node-6 523 may be configured to transition from the passive mode to the active mode upon receiving the first message within a predetermined time period from a reception end time of the second message, and transition from the passive mode to the sleep mode without receiving the first message within the predetermined time period from the reception end time of the second message.

Moreover, the switch-3 530 may be configured to receive the first message from the switch-2 520. For example, the switch-3 530 may be configured to transition from the sleep mode to the passive mode in response to determining, based on the energy detection operation, that an intensity of a reception signal of a preamble included in the first message is equal to or greater than the predetermined reference, and the switch-3 530 having transitioned to the passive mode may be configured to transition from the passive mode to the active mode upon receiving the MAC frame included in the first message.

The switch-3 530 may be configured to obtain the first information included in the first message, and using the first information, detect at least one end node to be operated in an active mode (S410). In particular, the switch-3 530 may be configured to detect the at least one end node to be operated in the active mode in a manner similar to operation S402 described above. An end node to be operated in the active mode may be detected as the end node-7 531, the switch-3 530 may be configured to transmit the first message to the end node-7 531. In addition, the switch-3 530 may be configured to transmit a second message to the end node-8 532 and the end node-9 533 which are not indicated by the first information included in the message among the end nodes 531, 532 and 533 connected to the switch-3 530. The transmission of the second message may be omitted. The switch-3 530 may be configured to transition from the active mode to the sleep mode or the passive mode after transmitting the second message (or after transmitting the first message when the transmission of the second message is omitted).

Furthermore, the end node-7 531 may be configured to transition from the sleep mode to the active mode upon receiving the first message from the switch-3 530 in a manner similar to each of the operations of the end node-1 511 and the end node-2 512 described above. The end node-8 532 and the end node-9 533 may be configured to transition from the sleep mode to the passive mode upon receiving the second message from the switch-3 530, in a manner similar to the operation of end node-3513 described above. In addition, the end node-8 532 and the end node-9 533 may be configured to transition from the passive mode to the active mode upon receiving the first message within the predetermined time period from the reception end time of the second message, and transition from the passive mode to the sleep mode without receiving the first message within the predetermined time period from the reception end time of the second message.

The methods according to exemplary embodiments of the present invention may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present invention or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present invention, and vice versa.

As is apparent from the above, only the electronic devices needed to perform a certain operation of the vehicle (or belonging to a certain system of the vehicle) may be woken up. In addition, electric devices not involved in performing the particular operation of the vehicle may operate in a sleep mode, or operate in a passive mode in which PHY layer units of the respective electronic device not involved in performing the particular operation of the vehicle are woken up. Therefore, it may be possible to prevent unnecessary waste of resources in the vehicle network.

While the exemplary embodiments of the present invention and their advantages have been described in detail, it should be understood that various changes, substitutions and alterations may be made herein without departing from the scope of the invention.

What is claimed is:

1. An operation method of an end node in a vehicle network, comprising:
   transitioning, by a processor, from a passive mode to an active mode;
   generating, by the processor, a first message including first information that indicates at least one end node to be operated in the active mode; and
   transmitting, by the processor, the first message to a switch,
   wherein, in the passive mode, a physical (PHY) layer unit included in the end node operates in an ON state and a medium access control (MAC) layer unit included in the end node operates in an OFF state,
   the first message is generated based on an Ethernet protocol, and
   the first information is included in a medium access control (MAC) frame of the first message.

2. The operation method of claim 1, wherein the first information is identification information regarding the at least one end node to be operated in the active mode.

3. The operation method of claim 2, wherein the identification information is at least one selected from the group consisting of: an Internet protocol (IP) address, a medium access control (MAC) address, and a port number of the at least one end node to be operated in the active mode.

4. The operation method of claim 1, wherein the first information is information indicating a vehicle system that corresponds to the at least one end node to be operated in the active mode.

5. The operation method of claim 1, wherein the first information is information indicating a vehicle operation performed by the at least one end node to be operated in the active mode.

6. An operation method of a switch in a vehicle network, comprising:
   receiving, by a processor, a first message of a first end node through a first port of the switch;
   identifying, by the processor, at least one port corresponding to the first port based on a predefined routing rule; and
   forwarding, by the processor, the first message through the at least one port of the switch,
   wherein the switch operates in a passive mode that a physical (PHY) layer unit of the switch operates in an ON state and a medium access control (MAC) layer unit of the switch operates in an OFF state, and
   the first message indicates at least one end node to be operated in an active mode that a PHY layer of the at least one end node operates in the ON state and a MAC layer unit of the at least one end node operates in an ON state.

7. The operation method of claim 6, further comprising:
   forwarding, by the processor, a second message indicating to operate in the passive mode through at least one port which is not corresponded to the first port.

8. The operation method of claim 6, wherein the first message includes identification information regarding the at least one end node to be operated in the active mode.

9. The operation method of claim 8 wherein the identification information is at least one selected from the group consisting of: an Internet protocol (IP) address, a medium access control (MAC) address, and a port number of the at least one end node to be operated in the active mode.

10. The operation method of claim 6, wherein the first message includes information indicating a vehicle system that corresponds to the at least one end node to be operated in the active mode.

11. The operation method of claim 6, wherein the first message includes information indicating a vehicle operation performed by the at least one end node to be operated in the active mode.

12. An operation method of a switch in a vehicle network, comprising:
   transmitting, by a processor, a first message instructing transition to a passive mode; and
   transmitting, by a processor, a second message including second information that indicates an end node to be operated in an active mode,
   wherein the first message includes a preamble without a medium access control (MAC) frame,
   in the passive mode, a physical (PHY) layer unit included in the end node operates in an ON state and a MAC layer unit included in the end node operates in an OFF state,
   in the active mode, the PRY layer unit and the MAC layer unit in the end node operate in the ON state.

13. The operation method of claim 12, wherein the first message is transmitted by the switch operating in the passive mode.

14. The operation method of claim 12, wherein the second message is transmitted by the switch operating in the active mode.

15. The operation method of claim 12, wherein the second information is identification information regarding the end node to be operated in the active mode.

16. The operation method of claim 15, wherein the identification information is at least one selected from the group consisting of: an Internet protocol (IP) address, a medium access control (MAC) address, and a port number of the end node to be operated in the active mode.

17. An operation method of an end node in a vehicle network, comprising:
- receiving, by a processor, a first message from a switch;
- transitioning, by the processor, from a sleep mode to a passive mode when an intensity of a reception signal of the first message is equal to or greater than a predetermined reference; and
- transitioning, by the processor, from the passive mode to an active mode when first information included in the first message indicates that the end node is a node to be operated in the active mode,
- wherein a physical (PHY) layer unit included in the end node is woken up in the passive mode, and the PHY layer unit and a medium access control (MAC) layer unit included in the end node are woken up in the active mode.

18. The operation method of claim 17, wherein the first information is identification information regarding the end node to be operated in the active mode.

19. The operation method of claim 18, wherein the identification information is at least one selected from the group consisting of: an Internet protocol (IP) address, a medium access control (MAC) address, and a port number of the end node to be operated in the active mode.

20. The operation method of claim 17, wherein the first information is information indicating a vehicle system that corresponds to the end node to be operated in the active mode.

21. The operation method of claim 17, wherein the first information is information indicating a vehicle operation performed by the end node to be operated in the active mode.

22. An operation method of an end node in a vehicle network, comprising:
- receiving, by a processor, a first message from a switch;
- transitioning, by the processor, from a sleep mode to a passive mode when an intensity of a reception signal of the first message is equal to or greater than a predetermined reference; and
- transitioning, by the processor, from the passive mode to an active mode when receiving a second message to instruct transition to the active mode from the switch,
- wherein the first message includes a preamble without a medium access control (MAC) frame, a physical (PHY) layer unit included in the end node is woken up in the passive mode, and the PHY layer unit and a MAC layer unit included in the end node are woken up in the active mode.

23. The operation method of claim 22, wherein the second message includes identification information regarding the end node to be operated in the active mode.

24. The operation method of claim 23, wherein the identification information is at least one selected from the group consisting of: an Internet protocol (IP) address, a medium access control (MAC) address, and a port number of the end node to be operated in the active mode.

25. The operation method of claim 22, wherein the second message includes information indicating a vehicle system that corresponds to the end node to be operated in the active mode.

26. The operation method of claim 22, wherein the second message includes information indicating a vehicle operation performed by the end node to be operated in the active mode.

27. An operation method of an end node in a vehicle network, comprising:
- receiving, by a processor, a first message from a switch;
- transitioning, by the processor, from a sleep mode to a passive mode when an intensity of a reception signal of the first message is equal to or greater than a predetermined reference; and
- transitioning, by the processor, from the passive mode to the sleep mode when a second message instructing transition to an active mode is not received from the switch,
- wherein, in the sleep mode, a physical (PHY) layer unit and a medium access control (MAC) layer unit included in the end node operate in an OFF state,
- in the passive mode, the PHY layer unit included in the end node operates in an ON state and the MAC layer unit included in the end node operates in the OFF state, and
- in the active mode, the PHY layer unit and the MAC layer unit included in the end node operate in the ON state.

28. The operation method of claim 27, wherein the first message includes a preamble without a MAC frame.

* * * * *